United States Patent
Ohara (10) Patent No.: US 10,596,731 B2
(45) Date of Patent: Mar. 24, 2020

(54) STENCIL PLATE FOR TIRE, TIRE VULCANIZATION MOLD AND MANUFACTURING METHOD OF TIRE USING THE SAME

(71) Applicant: Toyo Tire Corporation, Itami-shi, Hyogo (JP)

(72) Inventor: Masaaki Ohara, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 16/405,096

(22) Filed: May 7, 2019

(65) Prior Publication Data

US 2019/0366593 A1 Dec. 5, 2019

(30) Foreign Application Priority Data

May 30, 2018 (JP) .................. 2018-103680

(51) Int. Cl.
| | |
|---|---|
| *B29D 30/06* | (2006.01) |
| *B29C 33/42* | (2006.01) |
| *B60C 13/00* | (2006.01) |
| *B29D 30/72* | (2006.01) |
| *B29C 33/30* | (2006.01) |

(52) U.S. Cl.
CPC .......... *B29C 33/424* (2013.01); *B60C 13/001* (2013.01); *B29C 33/306* (2013.01); *B29D 30/0606* (2013.01); *B29D 30/0662* (2013.01); *B29D 2030/0612* (2013.01); *B29D 2030/726* (2013.01)

(58) Field of Classification Search
CPC ............ B29D 30/0606; B29D 30/0662; B29D 2030/0612; B29D 2030/726; B29C 33/306; B29C 33/424
See application file for complete search history.

(56) References Cited

U.S. PATENT DOCUMENTS 1,567,402 A * 12/1925 Venn ..................... B29C 33/424
425/35
1,969,083 A * 8/1934 Lawson ................. B29D 23/24
425/45

(Continued)

FOREIGN PATENT DOCUMENTS

| JP | 5421472 B1 | 2/2014 |
|---|---|---|
| JP | 2014-172360 A | 9/2014 |
| JP | 6259137 B1 | 1/2018 |

*Primary Examiner* — James P Mackey
(74) *Attorney, Agent, or Firm* — Westerman, Hattori, Daniels & Adrian, LLP (57) ABSTRACT

A tire vulcanization mold includes a side molding surface, a stencil plate for forming a mark that forms a convex mark on an outer surface of a side section, an attachment concave part provided to be recessed on the side molding surface and a male screw fixing the stencil plate to the attachment concave part. An attachment hole to which the male screw is screwed is provided in the attachment concave part and a tapered countersunk part is provided at an opening of the attachment hole. The stencil plate is provided with a bulge part with a tapered shape receiving a head part of the male screw and fitted to the countersunk part. The bulge part is provided with a protrusion protruding to an outer side with respect to a tapered outer peripheral surface thereof and abutting on a countersunk surface of the countersunk part.

8 Claims, 7 Drawing Sheets

(56) References Cited

U.S. PATENT DOCUMENTS

| | | | | |
|---|---|---|---|---|
| 2,296,016 | A | * | 9/1942 | Bostwick ........... B29D 30/0606 425/28.1 |
| 4,547,139 | A | * | 10/1985 | Hershberger ...... B29D 30/0606 425/192 R |
| 4,625,101 | A | * | 11/1986 | Hinks .............. G06K 19/06028 152/523 |
| 6,942,476 | B2 | * | 9/2005 | Parmelee ................ B29C 33/32 249/103 |
| 7,883,326 | B1 | * | 2/2011 | Parmelee ........... B29D 30/0662 249/103 |
| 9,649,890 | B2 | * | 5/2017 | Sakamoto ............. B60C 13/001 |
| 10,029,433 | B1 | | 7/2018 | Ohara |
| 2014/0261947 | A1 | | 9/2014 | Sakamoto et al. |

\* cited by examiner

FIG. 11
COMPARATIVE EXAMPLE

STENCIL PLATE FOR TIRE, TIRE VULCANIZATION MOLD AND MANUFACTURING METHOD OF TIRE USING THE SAME

CROSS-REFERENCE TO RELATED APPLICATIONS

This application is based upon and claims the benefit of priority from the prior Japanese Patent Application No. 2018-103680, filed on May 30, 2018; the entire contents of which are incorporated herein by reference.

BACKGROUND

1. Technical Field

An embodiment of the present invention relates to a stencil plate for a tire (hereinafter may be referred to as merely a stencil plate) for forming a mark on an outer surface of a side section of the tire, a tire vulcanization mold for vulcanization-molding the tire and a manufacturing method of the tire using the same.

2. Related Art

Generally, a mark such as a letter, a symbol and a figure is provided on an outer surface of a side section of a pneumatic tire for easy identification of a manufacturer, a type, a size, a manufacturing year or week and so on of the tire. In order to form such a mark, it is known that a stencil plate formed of a metal plate such as aluminum or iron is attached so as to be replaceable on a side molding surface of a vulcanization mold.

The above mark has been formed in a concave shape on the outer surface of the side section in related art. In recent years, it is desired that the mark is formed in a convex shape, and techniques for forming the convex mark are proposed (see Japanese Patent No. 6259137 (Patent Literature 1), JP-A-2014-0172360 (Patent Literature 2) and Japanese Patent No. 542147 (Patent Literature 3). In these literatures, a stencil plate having a concave part for forming the mark is fabricated by emboss processing using a thin metal plate. Through holes are provided at both ends of the stencil plate and the stencil plate is fixed to an attachment concave part on a side molding surface by countersunk screws through the through holes.

Figure 11:
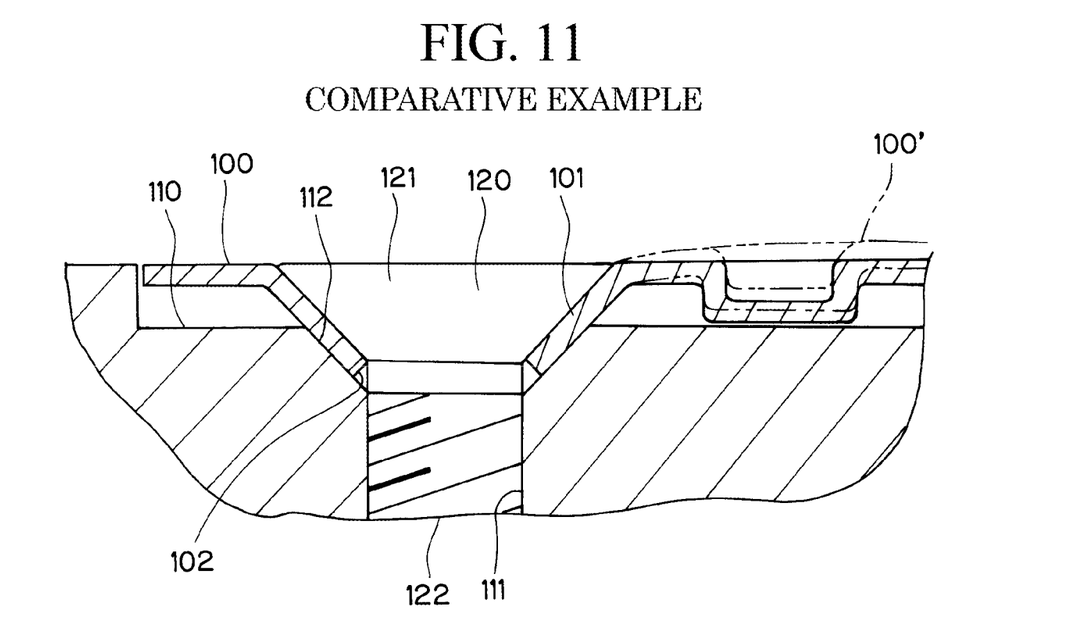
FIG. 11 is a cross-sectional view showing an attachment state of a stencil plate according to a comparative example.

FIG. 11 is a cross-sectional view showing an example in which a stencil plate 100 is fixed to an attachment concave part 110 by using a countersunk screw 120. A tapered bulge part 101 receiving a head part 121 of the countersunk screw 120 is formed in the stencil plate 100, and a through hole 102 through which a shaft part 122 of the countersunk screw 120 pierces is provided at a tip end of the bulge part 101. An attachment hole 111 to which the countersunk screw 120 is screwed is formed in the attachment concave part 110, and a tapered countersunk part 112 is provided in an opening of the attachment hole 111.

When the stencil plate 100 is fitted to the attachment concave part 110 and fixed by using the countersunk screw 120 in the above structure, there is a case where the bulge part 101 is pulled in a lower direction toward the center of the countersunk part 112 along with fastening of the countersunk screw 120. Accordingly, the stencil plate 100 may be attached in a state where a central part in a longitudinal direction thereof is bent in a floated manner as shown by a two-dot chain line 100' in FIG. 11, which will be a factor of a molding defect.

SUMMARY

In view of the above, an object of an embodiment of the present invention is to provide a stencil plate for a tire capable of being attached so as not to be bent when fastened with screws.

A stencil plate for a tire according to an embodiment of the present invention is the stencil plate for the tire to be attached to an attachment concave part provided to be recessed on a side molding surface of a tire vulcanization mold by using a male screw to form a convex mark on an outer surface of a side section of the tire. The stencil plate includes a bulge part with a tapered shape receiving a head part of the male screw and to be fitted to a tapered countersunk part of an attachment hole provided in the attachment concave part. A through hole through which a shaft part of the male screw pierces is provided at a tip end of the bulge part. The bulge part is provided with a protrusion protruding to an outer side with respect to a tapered outer peripheral surface thereof and abutting on a countersunk surface of the countersunk part.

A tire vulcanization mold according to an embodiment of the present invention includes a side molding surface molding an outer surface of a side section of a tire; the stencil plate; an attachment concave part provided to be recessed on the side molding surface, in which the stencil plate is attached thereinside; a male screw fixing the stencil plate to the attachment concave part; an attachment hole provided in the attachment concave part, to which the male screw is screwed; and a tapered countersunk part provided in an opening of the attachment hole.

A manufacturing method of a tire according to an embodiment of the present invention includes the step of vulcanization-molding a green tire by using the tire vulcanization mold.

According to the embodiment, the protrusion protruding to the outer side is provided in the bulge part of the stencil plate fitted to the countersunk part of the attachment concave part so as to abut on the countersunk surface of the countersunk part, therefore, it is possible to suppress the bulge part being pulled toward the center of the countersunk part at the time of fastening by the male screw. Accordingly, the stencil plate can be attached so as not to be bent.

DESCRIPTION OF EMBODIMENTS

Hereinafter, embodiments will be explained with reference to the drawings.

Figure 1:
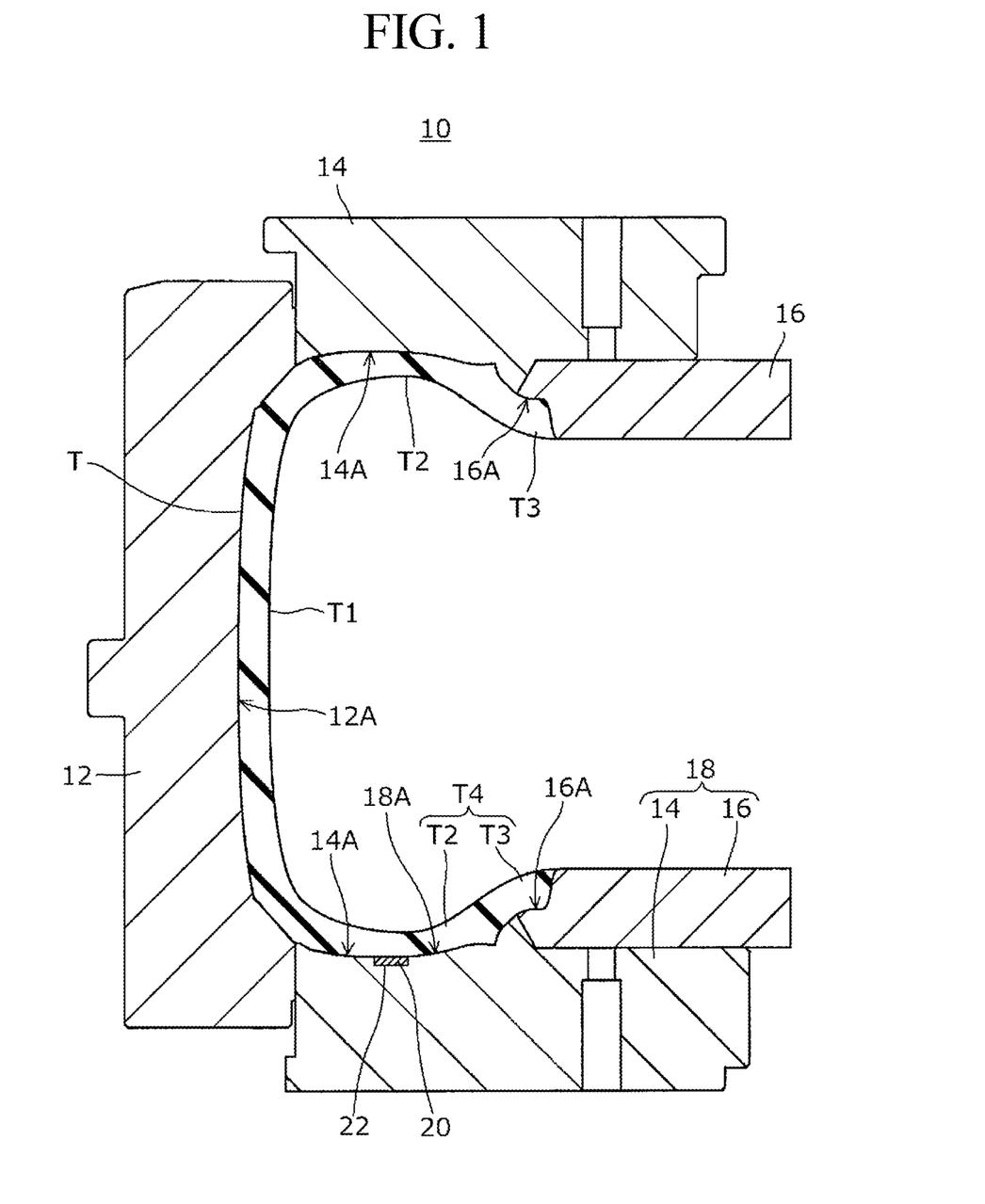
FIG. 1 is a half cross-sectional view showing a state of vulcanization by a tire vulcanization mold according to an embodiment.

FIG. 1 is a view showing a tire vulcanization mold (hereinafter referred to merely as a vulcanization mold) 10 according to an embodiment, which is used for vulcanization-molding a pneumatic tire T. Here, the pneumatic tire T is configured by including a tread section T1 forming a ground contact surface, a pair of sidewall sections T2, T2 and a pair of bead sections T3, T3 extending from both ends in a width direction of the tread section T1 to an inner side of a tire radial direction. The pneumatic tire T can adopt a common tire structure except for a mark provided in a side section T4. Here, the side section T4 is a concept including the sidewall section T2 and the bead section T3.

The vulcanization mold 10 is a mold for vulcanization-molding an unvulcanized green tire to be set therein. The vulcanization mold 10 includes a tread mold 12 having a tread molding surface 12A for molding an outer surface of the tread section T1, an upper and lower pair of sidewall molds 14, 14 having sidewall molding surfaces 14A, 14A for molding outer surfaces of the sidewall sections T2, and an upper and lower bead molds 16, 16 having bead molding surfaces 16A, 16A for molding outer surfaces of the bead sections T3, which form a cavity as a molding space of the tire T.

As shown in FIG. 1, a side mold 18 having a side molding surface 18A for molding the side section T4 includes a stencil plate 20 for forming a mark and an attachment concave part 22 to which the stencil plate 20 is attached. Here, the side mold 18 is a concept including the sidewall mold 14 and the bead mold 16. The side molding surface 18A is a concept including the sidewall molding surface 14A and the bead molding surface 16A.

Although the stencil plate 20 and the attachment concave part 22 are provided on the sidewall molding surface 14A in this example, they may be provided on the bead molding surface 16A as well as may be provided on both the sidewall molding surface 14A and the bead molding surface 16A respectively.

Figure 2:
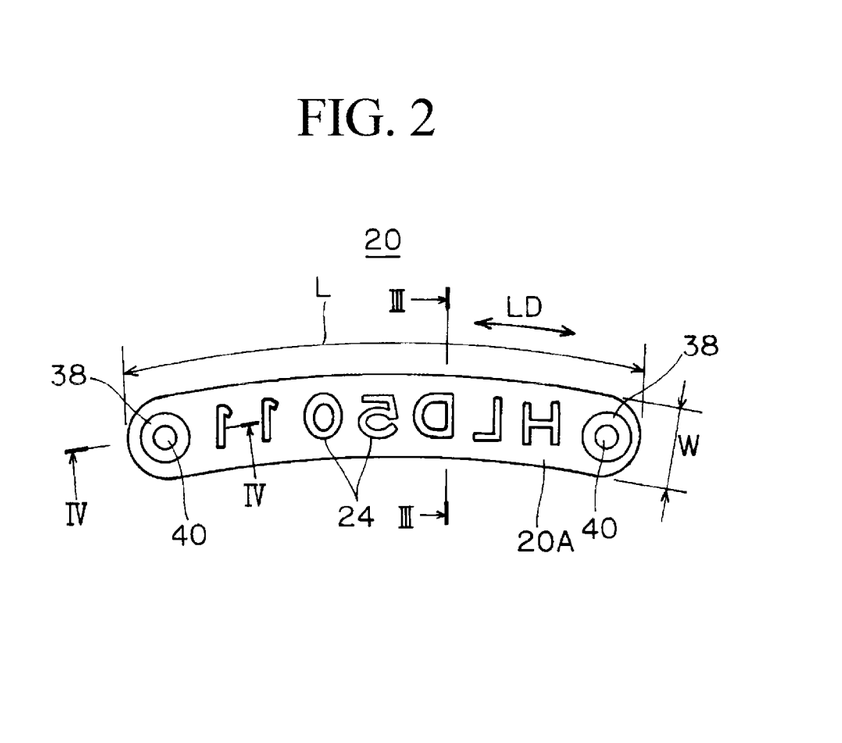
FIG. 2 is a front view of a stencil plate.
Figure 6:
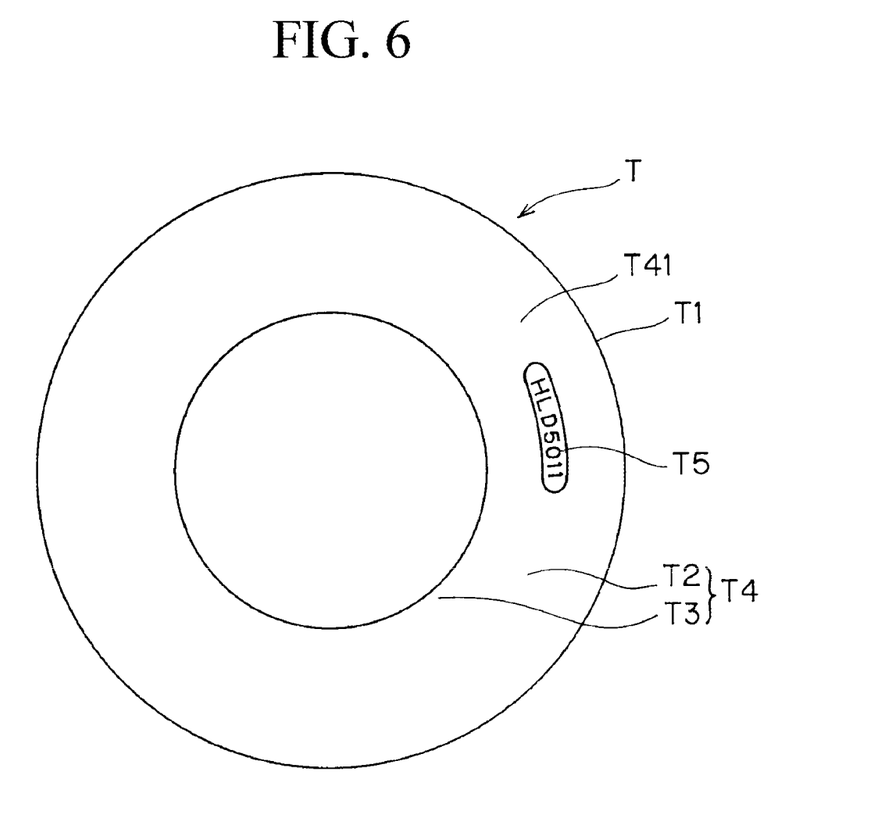
FIG. 6 is a side view of a tire.
Figure 7:
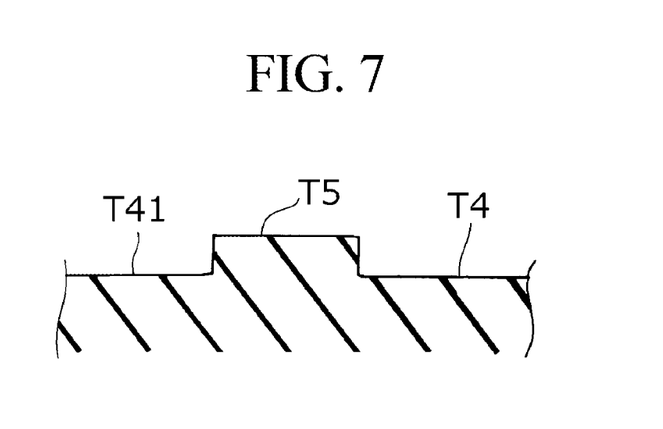
FIG. 7 is an enlarged cross-sectional view of a side section where a mark is formed.

The stencil plate 20 is a member for forming a convex mark T5 on an outer surface T41 of the side section T4 as shown in FIG. 1, FIG. 6 and FIG. 7. The stencil plate 20 is formed of a laterally-long metal plate having a length L in a tire circumferential direction larger than a width W in a tire radial direction as shown in FIG. 2. In detail, the stencil plate 20 is an elongated strip-shaped member extending with a curve along the tire circumferential direction. A thickness t1 of the metal plate (see FIG. 3) is not particularly limited, which may be, for example, 0.2 to 0.8 mm or 0.4 to 0.7 mm.

Figure 3:
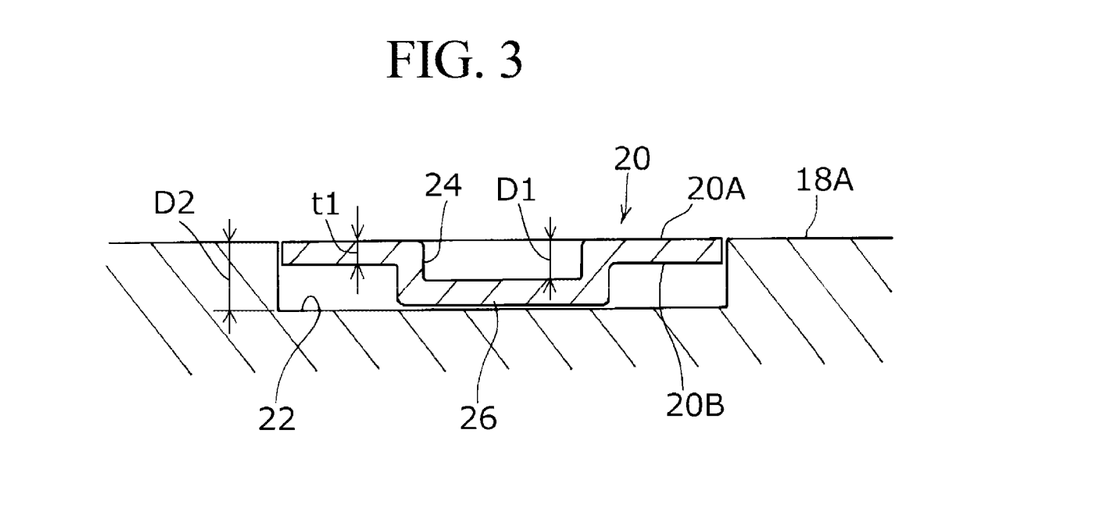
FIG. 3 is a cross-sectional view showing an attachment state to an attachment concave part of the stencil plate taken along line III-III of FIG. 2.

The stencil plate 20 has a concave part 24 for forming the mark formed to be recessed from a surface 20A of the stencil plate 20 by emboss processing as shown in FIG. 2 and FIG. 3. That is, the stencil plate 20 is provided with the concave part 24 on the surface 20A facing the tire T side (namely, facing the cavity), which is formed by emboss processing (embossing method) from the surface 20A side. The concave part 24 has a shape obtained by inverting the mark T5 formed on the outer surface T41 in the side section T4 (see FIG. 6 and FIG. 7). As the mark T5, letters, symbols and figures indicating a manufacturer, a type, a size, a manufacture number, a manufacture date and so on of the tire can be cited. In the example of FIG. 2, a character string "HLD5011" is the mark T5, and the concave part 24 is formed in a shape obtained by inverting the mark. A depth D1 of the concave part 24 from the surface 20A is not particularly limited and may be, for example, 0.3 to 1.2 mm.

As the concave part 24 is formed, a convex part 26 corresponding to the concave part 24 is formed on a back surface 20B side of the stencil plate 20. That is, the convex part 26 is a part corresponding to the convex part 24 seen from the back surface 20B side of the stencil plate 20, therefore, a protruding height thereof is substantially the same as the depth of the concave part 24.

The attachment concave part 22 is provided to be recessed on the side molding surface 18A as shown in FIG. 3, in which the stencil plate 20 is attached thereinside. The attachment concave part 22 is a laterally-long concave groove corresponding to the stencil plate 20 so that the stencil plate 20 is fitted thereto. A depth D2 of the attachment concave part 22 is not particularly limited and may be, for example, 0.8 to 1.8 mm or 1.0 to 1.5 mm.

Figure 4:
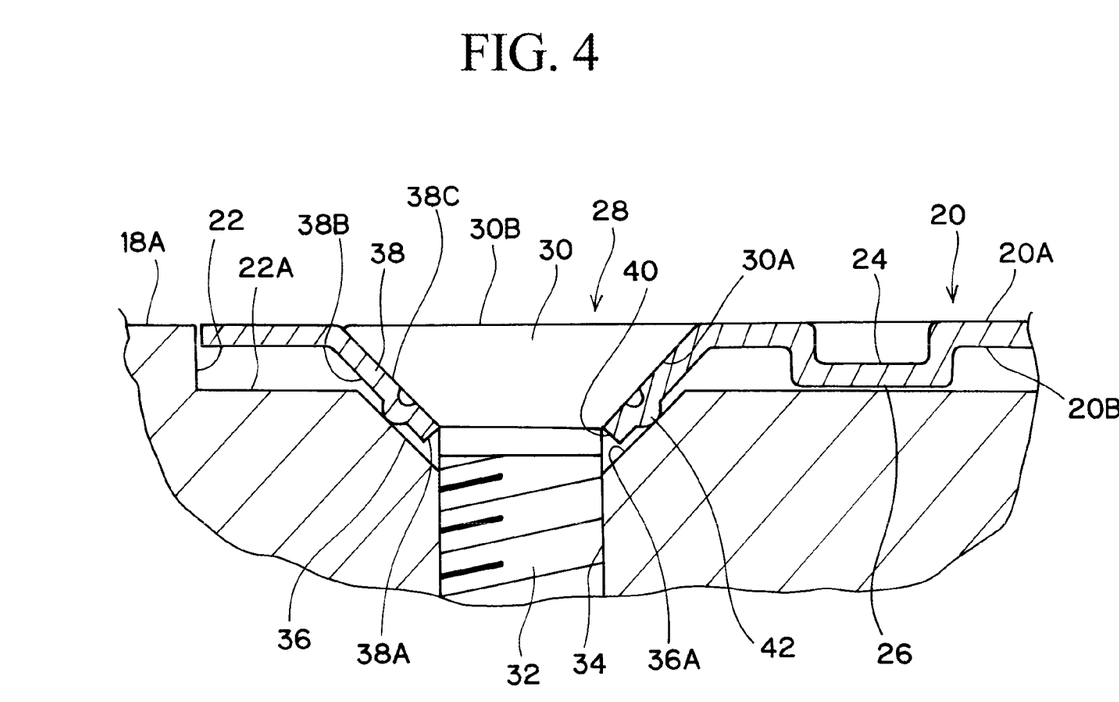
FIG. 4 is a cross-sectional view showing an attachment state to the attachment concave part of the stencil plate taken along IV-IV line of FIG. 2.

The stencil plate 20 is fitted or inserted into the attachment concave part 22 and fixed in the attachment concave part 22 by male screws 28 as shown in FIG. 4. In this example, the stencil plate 20 is fixed to the attachment concave part 22 by the male screws 28 at both ends in a longitudinal direction LD.

Figure 5:
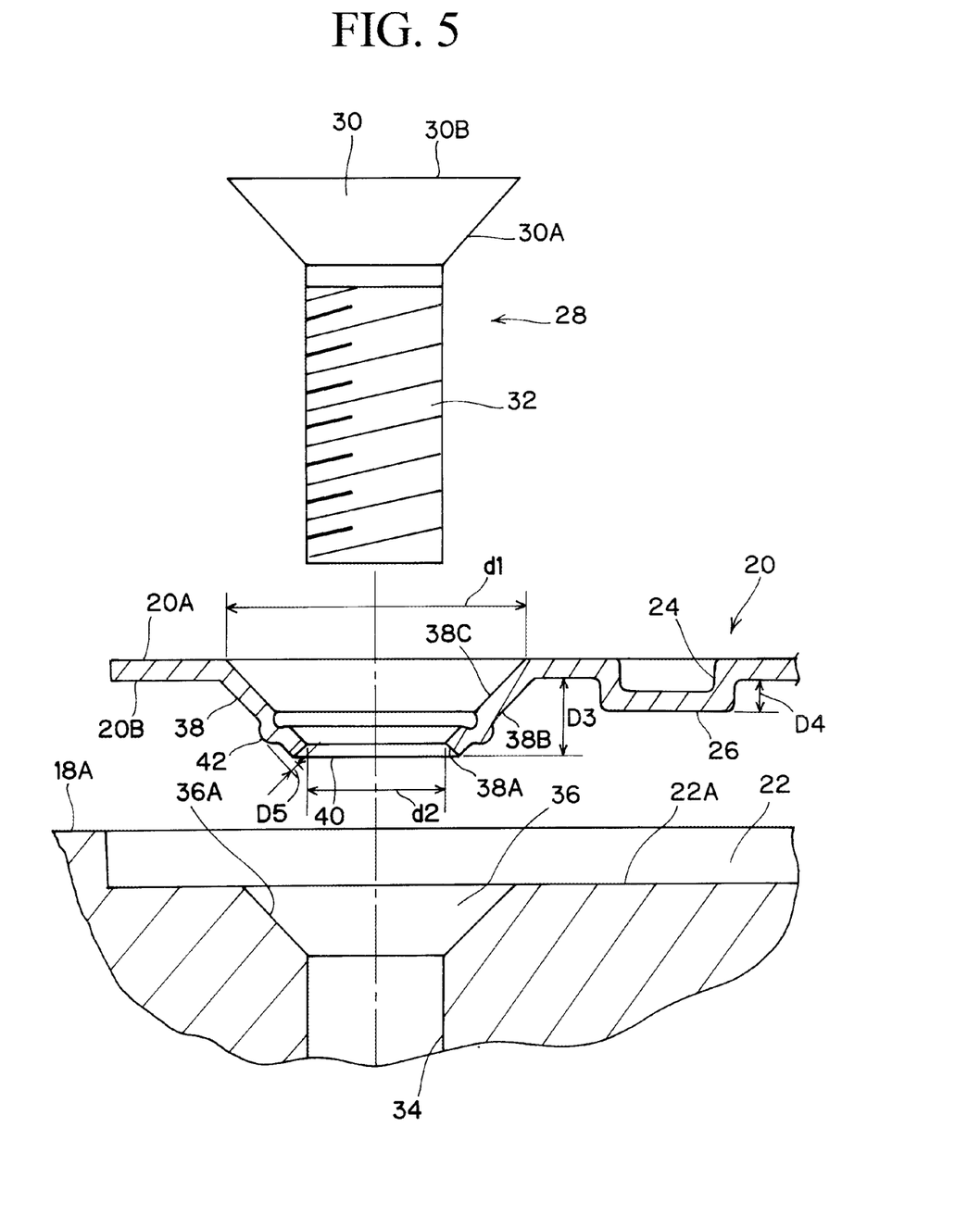
FIG. 5 is an exploded view of FIG. 4.

The male screw 28 is formed by a head part 30 with a tapered (namely, truncated-conical shaped) bearing surface 30A and a shaft part 32 with a thread provided on an outer peripheral surface as shown in FIG. 5. The countersunk screw (namely, a flat-head screw) in which an upper surface 30B of the head part 30 is formed in a flat surface shape is used in this example, but an oval head screw in which an upper surface of a head part is rounded may be also used.

As shown in FIG. 4 and FIG. 5, an attachment hole 34 to which the male screw 28 is screwed is provided on a bottom surface 22A of the attachment concave part 22. A thread is provided on an inner peripheral surface of the attachment hole 34. A tapered countersunk part 36 is provided at an opening (namely, a portion opening to the attachment concave part 22) of the attachment hole 34. That is, the countersunk part 36 is a truncated-conical shaped space in which a diameter is gradually reduced as coming downward from the bottom surface 22A of the attachment concave part 22, having a countersunk surface 36A with a tapered surface.

A tapered bulge part 38 receiving the head part 30 of the male screw 28 and fitted to the countersunk part 36 is provided in the stencil plate 20. The bulge part 38 is formed to be recessed from the surface 20A by emboss processing (embossing method) from the surface 20A side of the stencil plate 20 in the same manner as the concave part 24, which is provided in a convex shape seen from the back surface 20B. In detail, the bulge part 38 has a tapered shape (namely, a truncated-conical shape) gradually reduced in diameter as going away from the surface 20A. Then, a circular through hole 40 through which the shaft part 32 of the male screw 28 pierces is provided in a tip end (namely, a lower end) 38A as an apex of the bulge part 38.

The through holes 40 are respectively provided at both ends in the longitudinal direction LD of the stencil plate 20 as shown in FIG. 2, and the attachment holes 34 are respectively provided at both ends in the longitudinal direction of the attachment concave part 22 so as to correspond to the through holes 40.

As shown in FIG. 5, a protruding height D3 of the bulge part 38 from the back surface 20B of the stencil plate 20 is set to be larger than a protruding height D4 of the concave part 24 to the back surface 20B side (namely, a protruding height of the convex part 26). It is preferable that both heights D3 and D4 are set so that the back surface of the concave part 24 (namely, the convex part 26) does not abut on the bottom surface 22A of the attachment concave part 22 (for example, so as to be slightly floated) in a state where the bulge part 38 is fitted to the countersunk part 36.

An inclination angle of an inner peripheral part 38C of the bulge part 38 with respect to an axial direction corresponds to an inclination angle of the bearing surface 30A of the male screw 28 with respect to the axial direction. Accordingly, when the head part 30 of the male screw 28 is housed inside the bulge part 38, a gap between the bearing surface 30A of the male screw 28 and the inner peripheral surface 38C of the bulge part 38 is filled and entering of rubber to this part can be prevented.

A ratio between a large-diameter dimension (opening diameter at an upper end of the largest diameter) "d1" of the bulge part 38 and a small-diameter dimension (opening diameter at a lower end of the smallest diameter) d2 is not particularly limited and may be, for example, d1/d2×100 is 120 to 300%.

As shown in FIG. 4 and FIG. 5, a protrusion 42 protruding to the outer side (namely, outward in the radial direction) with respect to the tapered outer peripheral surface 38B and abutting on the countersunk surface 36A of the countersunk part 36 is provided in the bulge part 38. The protrusion 42 is provided in a portion entering the inside of the countersunk part 36 in the bulge part 38, which is provided at a position where the protrusion 42 abuts on the countersunk surface 36A of the countersunk part 36 when the male screw 28 is fastened.

The protrusion 42 is provided by bulging a part of the tapered outer peripheral surface 38B of the bulge part 38 to the outer side. That is, the protrusion 42 is provided in the position with a distance in the axial direction (namely, an upper and lower direction) from the tip end 38A, not in the tip end 38A of the bulge part 38, which is formed by plastically deforming a part of a side wall of the tapered bulge part 38 so as to protrude outwardly in a convex shape. In detail, the protrusion 42 is provided in a ring shape over the entire circumference of the bulge part 38 at the position with an approximately fixed distance from the tip end 38A of the bulge part 38.

The protrusion 42 may be formed simultaneously when the bulge part 38 is formed by emboss processing (embossing method), or may be formed separately by press processing after the bulge part 38 is formed by emboss processing.

A protruding height D5 of the protrusion 42 with respect to the outer peripheral surface 38B of the bulge part 38 is not particularly limited and may be, for example, 0.1 to 1.2 mm or 0.3 to 1.0 mm.

When the stencil plate 20 is attached to the attachment concave part 22, the shaft part 32 of the male screw 28 is allowed to pierce through the through hole 40 to be screwed to the attachment hole 34 in a state where the stencil plate 20 is fitted or inserted into the attachment concave part 22 and the bulge part 38 is fitted to the countersunk part 36 of the attachment hole 34. Accordingly, the head part 30 of the male screw 28 is housed inside the bulge part 38 and the bulge part 38 is sandwiched between the head part 30 and the countersunk surface 36A as shown in FIG. 4, thereby fixing the stencil plate 20 to the attachment concave part 22.

When manufacturing the pneumatic tire T by using the vulcanization mold 10 having the above structure, a green tire (unvulcanized tire) is set inside the vulcanization mold 10 and the mold is closed, then, a not-shown bladder arranged inside the green tire is expanded and the green tire is pushed onto an inner face of the mold to hold the mold in a heated state. Accordingly, the green tire is vulcanization-molded and the pneumatic tire T is obtained. The molding of the green tire can be performed by using a well-known method.

In the obtained pneumatic tire T, the mark T5 is formed on the outer surface T41 of the side section T4 (sidewall section T2 in the shown example) as shown in FIG. 6. The mark T5 has a convex shape protruding from the outer surface T41 of the side section T4 as shown in FIG. 7, which has excellent visibility.

According to the embodiment, the protrusion 42 protruding to the outer side is provided in the bulge part 38 of the stencil plate 20 fitted to the countersunk part 36 of the attachment concave part 22 so as to abut on the countersunk surface 36A of the countersunk part 36. Accordingly, the protrusion 42 abuts on the countersunk surface 36A and is pushed onto the countersunk surface 36A at the time of fastening by the male screw 28, therefore, it is possible to suppress the bulge part 38 being pulled in a lower direction toward the center of the countersunk part 36. Accordingly, it is possible to suppress the stencil plate 20 being attached in a bent state, and a molding defect caused by that can be prevented.

It is sufficient that at least the protrusion 42 abuts on the countersunk surface 36A in the bulge part 38 after the male screw 28 is fastened, but it is also preferable that the entire portion entering the inside of the countersunk part 36 abuts on the countersunk surface 36A by deforming the bulge part 38 by fastening. In both cases, the bulge part 38 is strongly pushed onto the countersunk surface 36A locally by the protrusion 42, therefore, it is possible to suppress the bulge part 38 being pulled downward as described above.

Also according to the embodiment, the effect of suppressing the bulge part 38 being pulled downward can be increased as the protrusion 42 is provided over the entire circumference of the bulge part.

It is preferable in the embodiment that the protrusion 42 of the bulge part 38 abuts on the countersunk surface 36A before the concave part 24 forming the mark T5 abuts on the bottom surface 22A of the attachment concave part 22. Accordingly, it is possible to suppress deformation of the concave part 24 for forming the mark by abutting on the bottom surface 22A of the attachment concave part 22.

Although the protrusion 42 is formed in the ring shape over the entire circumference of the bulge part 38 in the above embodiment, it is also preferable that a plurality protrusions are provided in a circumferential direction of the bulge part. For example, in the example shown in FIG. 8, dot-shaped protrusions 42A are provided at plural positions in the circumferential direction of the bulge part 38. A plurality of protrusions 42A are provided at given intervals in the circumferential direction at positions with an approximately fixed distance in the axial direction from the tip end 38A of the bulge part 38, which are formed as hemispheric protrusions.

Figure 8:
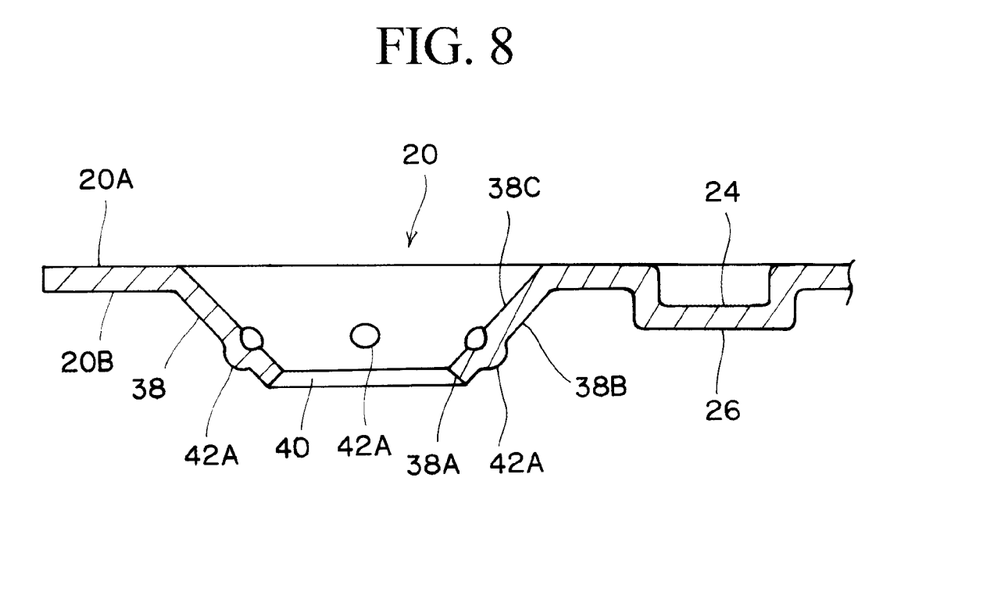
FIG. 8 is a cross-sectional view of a relevant part of a stencil plate according to another embodiment.

The shape of the protrusions 42A is not limited to the hemispheric shape but various shapes such as an elliptical shape, polygonal shapes including a triangular shape, a rectangular shape and the like in plan view can be adopted.

The shape of the protrusions is not limited to the dot-shape but, for example, stripe-shaped protrusions (namely, ridges) extending in the circumferential direction of the bulge part 38 may be formed intermittently.

The above protrusions 42A may be formed simultaneously when the bulge part 38 is formed by emboss processing in the same manner as the protrusion 42 of the above embodiment, or may be formed by, for example, punching after the bulge part 38 is formed by emboss processing.

Although the protrusion 42 is provided with a distance from the tip end 38A of the bulge part 38 in the above embodiment, the protrusion may be provided in a bending shape at the tip end of the bulge part.

Figure 9:
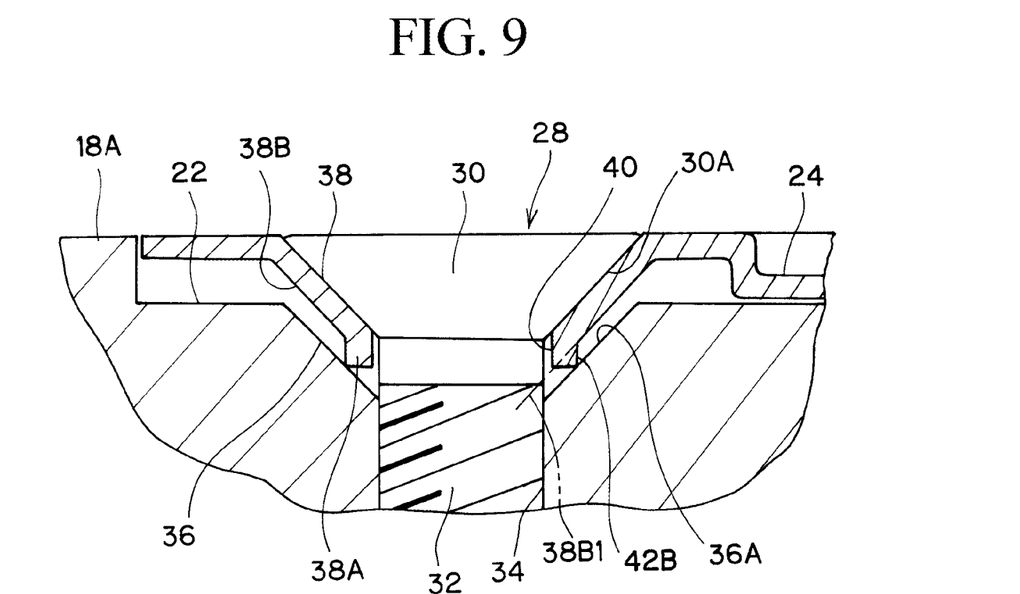
FIG. 9 is a cross-sectional view showing an attachment state of a stencil plate according to further another embodiment.

For example, in an example shown in FIG. 9, the tip end 38A of the tapered bulge part 38 is formed in a shape bending downward, namely, the tip end 38A is formed in a short tubular shape parallel to the axial direction of the bulge pan 38. Therefore, a protrusion 42B protruding outward with respect to the tapered outer peripheral surface 38B is formed at the tip end 38A of the bulge part 38 over the entire circumference of the bulge part 38. The protrusion 42B protrudes to the outer side of an extension line 38B1 of the tapered outer peripheral surface 38B in the radial direction, and thus, protrudes to the outer side with respect to the outer peripheral surface 38B as shown in cross section in FIG. 9. Therefore, the protrusion 42B abuts on the countersunk surface 36A before the outer peripheral surface 38B abuts thereon. Accordingly, the protrusion 42B abuts on the countersunk surface 36A and is pushed onto the countersunk surface 36A at the time of fastening by the male screw 28, therefore, it is possible to suppress the bulge part 38 being pulled in the lower direction toward the center of the countersunk part 36 in the same manner as the above embodiment.

Figure 10:
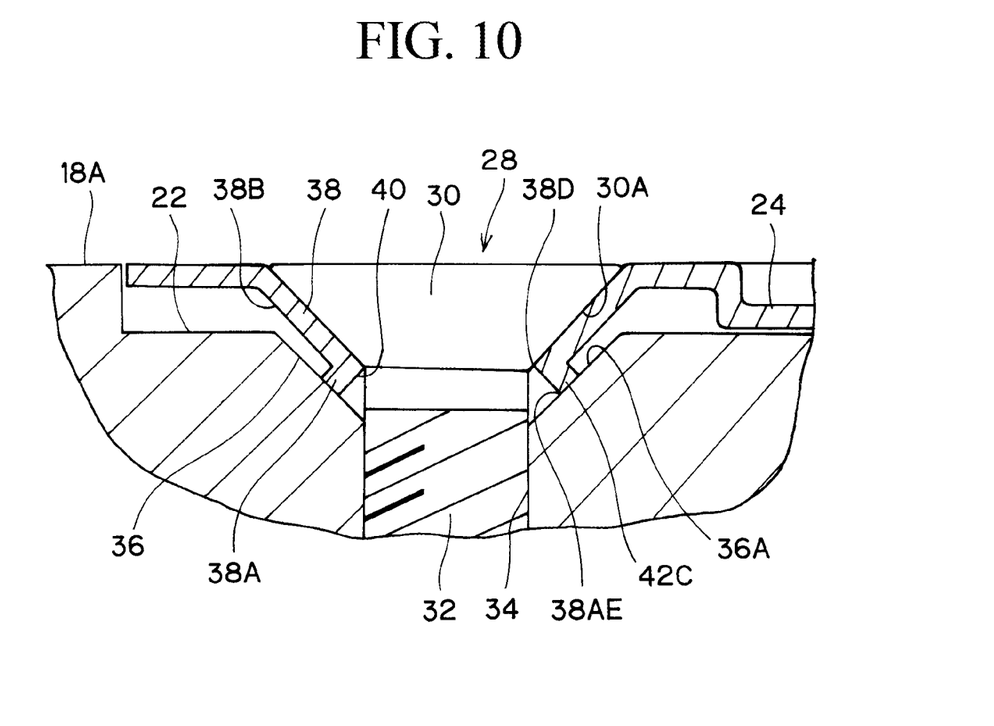
FIG. 10 is a cross-sectional view showing an attachment state of a stencil plate according to further another embodiment.

It is also preferable that the tip end 38A of the bulge part 38 is bent to the outer side so as to be expanded in a reverse-tapered shape to provide a protrusion 42C as shown in FIG. 10. That is, a small-diameter part 38D is formed by reducing the diameter of the tapered bulge part 38 once at the tip end part thereof, then, the small-diameter part 38D is expanded toward an opening end 38AE in this example. Therefore, the small-diameter part 38D does not correspond to the opening end 38AE. The tip end 38A is expanded in the reverse-tapered shape to provide the protrusion 42C as described above, thereby the protrusion 42C can be pushed onto the countersunk surface 36A more strongly at the time of fastening by the male screw 28. Therefore, it is possible to suppress the bulge part 38 being pulled in the lower direction toward the center of the countersunk part 36 effectively.

Some embodiments have been explained above, and these embodiments are cited as examples and do not intend to limit the scope of the invention. These novel embodiments can be achieved in other various manners, and various omissions, replacements and alterations may occur within a scope not departing from the gist of the invention.

What is claimed is:

1. A stencil plate for a tire to be attached to an attachment concave part provided to be recessed on a side molding surface of a tire vulcanization mold by using a male screw to form a convex mark on an outer surface of a side section of the tire, comprising:
    a bulge part with a tapered shape receiving a head part of the male screw and to be fitted to a tapered countersunk part of an attachment hole provided in the attachment concave part,
    a through hole provided at a tip end of the bulge part, through which a shaft part of the male screw pierces, and
    a protrusion provided in the bulge part, protruding to an outer side with respect to a tapered outer peripheral surface of the bulge part and abutting on a countersunk surface of the countersunk part.

2. The stencil plate for the tire according to claim 1, wherein the protrusion is provided by bulging a part of the tapered outer peripheral surface of the bulge part to the outer side.

3. The stencil plate for the tire according to claim 1, wherein the protrusion is provided in a bending shape at a tip end of the bulge part.

4. The stencil plate for the tire according to claim 3, wherein the protrusion is provided by bending the tip end of the bulge part to the outer side so as to be expanded in a reverse-tapered shape.

5. The stencil plate for the tire according to claim 1, wherein the protrusion is provided in a ring shape over the entire circumference of the bulge part.

6. The stencil plate for the tire according to claim 1, wherein a plurality of protrusions are provided in a circumferential direction of the bulge part.

7. A tire vulcanization mold comprising:
    a side molding surface molding an outer surface of a side section of a tire;
    the stencil plate according to claim 1;
    an attachment concave part provided to be recessed on the side molding surface, in which the stencil plate is attached thereinside;
    a male screw fixing the stencil plate to the attachment concave part;
    an attachment hole provided in the attachment concave part, to which the male screw is screwed; and
    a tapered countersunk part provided in an opening of the attachment hole.

8. A manufacturing method of a tire comprising the step of:
    vulcanization-molding a green tire by using the tire vulcanization mold according to claim 7.

* * * * *